C. FORTH.
PIPE JOINT.
APPLICATION FILED SEPT. 20, 1913.
1,154,985.
Patented Sept. 28, 1915.
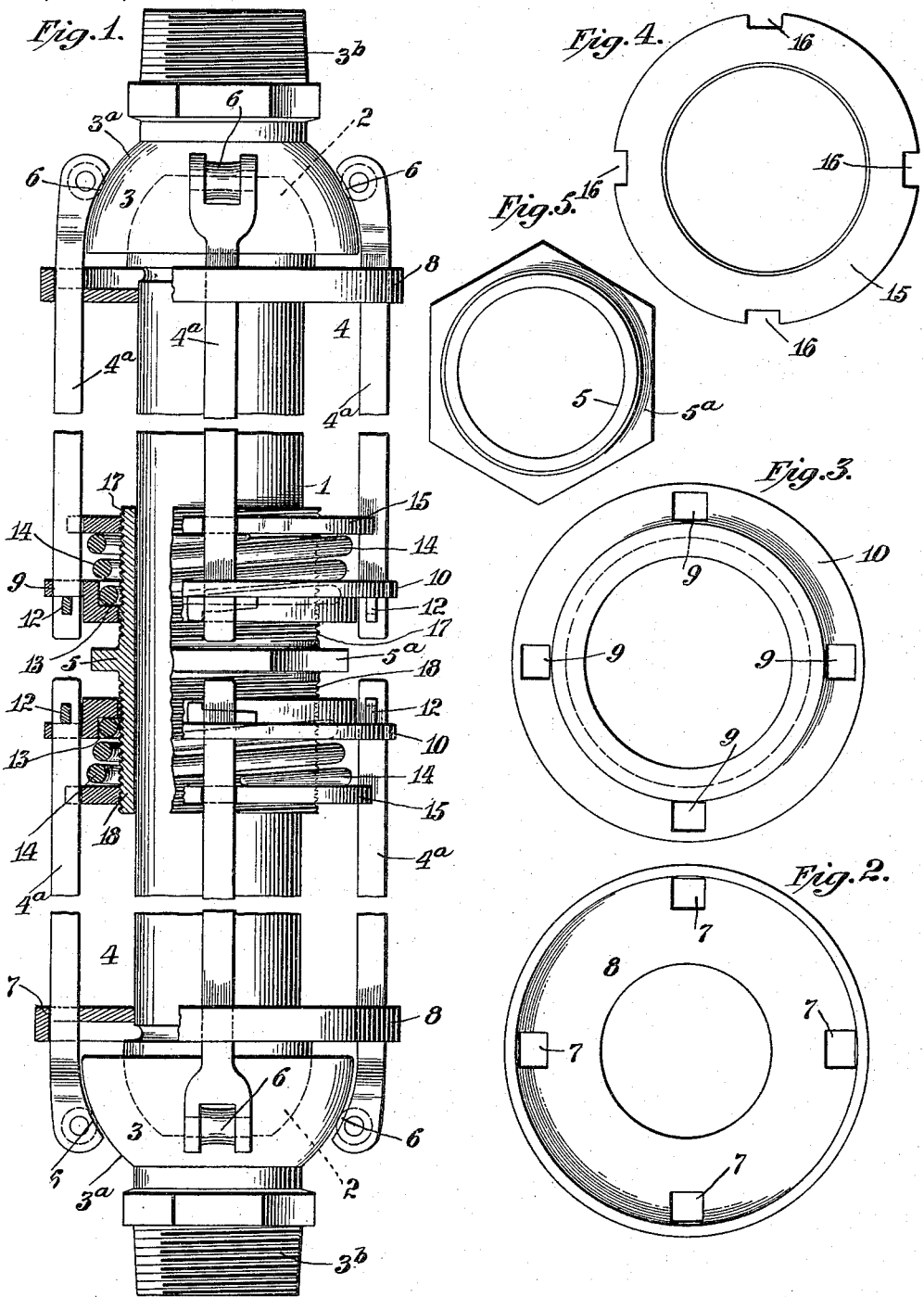
Witnesses:
J. D. Mitchell
E. J. Hotchkiss.
Inventor
Charles Forth
By his Attorneys
Rogers, Kennedy & Campbell

UNITED STATES PATENT OFFICE.

CHARLES FORTH, OF BOSTON, MASSACHUSETTS.

PIPE-JOINT.

1,154,985.  Specification of Letters Patent.  Patented Sept. 28, 1915.

Application filed September 20, 1913. Serial No. 790,826.

*To all whom it may concern:*

Be it known that I, CHARLES FORTH, a citizen of the United States, residing at Boston, in the county of Suffolk and State of Massachusetts, have invented certain new and useful Improvements in Pipe-Joints, of which the following is a specification, reference being had therein to the accompanying drawing.

This invention relates to pipe joints of the type embodying hollow end members and an intermediate hollow connecting member, the objects of the invention being to provide a construction in which the parts will be capable of a freedom of relative movements in all directions and in which there will be provision for adjusting the several members relatively to each other to take up the wear of the parts and to preserve their proper operative relations in effecting a fluid-tight connection.

The invention is applicable more particularly to the "ball and socket type" of joint and it consists in combination with a central hollow section provided with ball members, socket members applied thereto, confining members engaging the socket members and a common adjusting device surrounding the central section and operatively engaged with the confining members, the construction and arrangement of the parts being such that by the actuation of the adjusting device, both of the confining members will be moved uniformly and simultaneously and will act to adjust and retain the socket members in proper fluid-tight engagement with the ball members.

The invention also consists in the provision of compression springs between the adjusting device and the confining members, in such relation to said parts that the socket members will be held with a regulable spring pressure in contact with the ball members.

The invention consists also of the details of construction and combination of parts hereinafter described and claimed.

In the accompanying drawings: Figure 1 is a side elevation partly in section of a pipe joint having my invention embodied therein. Figs. 2, 3, 4 and 5 are plan views of details of the device.

My improved joint comprises a central hollow section having fixed to its opposite ends hollow ball members 2, 2; hollow socket members 3, 3, applied to the ball members so that they may rock relatively thereto in all angular directions; confining members 4, 4, engaging respectively the socket members and extending inwardly toward each other; and a common adjusting device 5, surrounding the central section 1, and having operative engagement with both confining members as will be more fully described hereinafter.

The socket members are formed with rounded or spherical outer surfaces $3^a$, $3^a$, and they are provided with threaded stems $3^b$, for the attachment of the pipe terminals thereto.

The confining members loosely engage the curved external surfaces of the socket members in such manner that these members will be permitted to rock freely on the ball members universally in relation to the confining members while being subject to the confining action of said members. The confining members consist each of a number of rods or stems $4^a$, $4^a$, $4^a$, $4^a$, four in the present instance, which extend longitudinally of the section 1, and are arranged at intervals therearound. At their outer ends these rods have journaled in them antifriction rollers 6, 6, 6, 6, which rollers bear against the outer curved surface of the socket members and are concaved so as to conform to said surface. Inward of the rollers the rods extend loosely through openings 7, 7, 7, 7, in confining plates 8, 8, loosely encircling the central section just inward of the ball members 2, there being of course two of these plates one for the rods of each confining member. The two sets of rods of the respective confining members extend inwardly toward each other to about the middle of the section 1, at which point the two sets of rods pass loosely through openings 9, 9, 9, 9, respectively in two annular bearing plates 10, 10, surrounding the central section 1, the rods being confined in the plates by means of keys 12, extending through the ends of the rods at the inner sides of the plates and affording a bearing for the respective plates. The plates are formed with annular sockets 13, in their outer sides in which sockets are seated spherical compression springs 14, surrounding the central section 1, the outer ends of these springs being seated respectively against annular washer plates 15, 15, also surrouding the section 1, and formed in their outer edges with notches 16, in which the several rods 4ª loosely extend. The two washer plates are internally threaded and are screwed respectively on right and left hand screw threads 17 and 18 of the adjusting device 5, before alluded to which adjusting device is annular in form and consists of a sleeve loosely encircling the central section midway between its ends and being provided at its center with a projecting head or flange 5ª, for turning it.

From the construction described it will be understood that the adjusting device is in operative engagement with the confining members through the medium of the two washer plates 15 screwed on said adjusting device and the compression springs between said washer plates and the bearing plates of the confining members, so that by the actuation of the adjusting device the motion of the washer plates will be transmitted to the confining members which will in turn act on the socket members. Further it will be noted that by reason of the interposition of the compression springs 14, as described, the confining members will act with a spring effect on the socket members which spring effect may be varied as to tension by the adjustments of the washer plates by the rotation of the adjusting sleeve. With the parts of the device arranged as shown in Fig. 1, the confining members will act to draw the two socket members yieldingly against the respective ball members and the socket members will be permitted to move relatively to the ball members in all angular directions as well as being capable of a swiveling motion around an axis coincident with the axis of the central section, the outer surfaces of the socket members in these movements slipping past the antifriction rollers or rotating said rollers according to the character of the movement whether a rocking movement or a true swiveling movement. In the event of the contacting surfaces of the ball members and the socket members becoming worn, the compression springs will automatically take up the looseness and by means of the adjusting device the parts may be caused to engage with a greater or less degree of closeness as the conditions encountered in practice may demand.

It will be observed that the adjusting device is common to both confining members and that the actuation of the said device will move said confining members uniformly and simultaneously with the result that the same degree of pressure and the same extent of movement will be imparted to the socket members.

In the accompanying drawings and foregoing description I have set forth my invention in the particular form of construction which I prefer to adopt and which in practice has been found to answer to a satisfactory degree the ends to be obtained. It will be understood however, that the device may be variously modified and changed as regards its details without departing from the spirit of the invention and it will be understood further that the invention is not limited to any particular form or construction of the parts except in so far as such limitations are specified in the claims.

Having thus described my invention what I claim is:

1. In a pipe joint, the combination of a hollow central section provided with ball members, hollow socket members applied to the ball members, confining members engaging the socket members respectively and extending inwardly toward each other, and an annular adjusting device rotatively mounted on the central section and operatively connected with said confining members for adjusting the latter.

2. In a pipe joint, the combination of a hollow central section provided with ball members, hollow socket members applied to the ball members, external confining members engaging the socket members respectively, springs engaging the confining members respectively, and a common adjusting means rotatively mounted on the central section and engaging said springs.

3. In a pipe joint, the combination of a hollow central section provided with ball members, hollow socket members applied to the ball members, confining members engaging the socket members respectively, springs engaging the confining members, movable seats for the springs, and a common adjusting device for said seats.

4. In a pipe joint, the combination of a hollow central section provided with ball members, hollow socket members applied to the ball members, confining members engaging the socket members respectively and extending inwardly toward each other, spiral springs bearing at their inner ends against the confining members respectively, threaded movable washer plates forming seats for the outer ends of the springs, and a threaded adjusting sleeve encircling the central section and having screw engagement with said washers.

5. In a pipe joint, the combination of a hollow central section provided with ball members, socket members applied thereto, confining members engaging the socket members and provided with bearing plates surrounding the central section, an annular adjusting device also surrounding the central section and provided with right and left hand screws, threaded washer plates engaging with said screws respectively, and springs seated between the bearing plates and washer plates.

In testimony whereof I have affixed my signature in presence of two witnesses.

CHARLES FORTH.

Witnesses:
 ALVOY BLAIR,
 R. LAROSE.

Copies of this patent may be obtained for five cents each, by addressing the "Commissioner of Patents, Washington, D. C."